United States Patent [19]
Leonoff

[11] Patent Number: 6,082,114
[45] Date of Patent: Jul. 4, 2000

[54] DEVICE FOR HEATING AND COOLING A BEVERAGE

[76] Inventor: Christopher A. Leonoff, 129 White Oaks La., Carmel Valley, Calif. 93924

[21] Appl. No.: 09/058,237

[22] Filed: Apr. 9, 1998

[51] Int. Cl.[7] ................................................ F25B 21/02
[52] U.S. Cl. ........................... 62/3.64; 62/457.9; 62/371; 62/457.4
[58] Field of Search .................................. 62/457.9, 371, 62/457.4, 3.64

[56] References Cited

U.S. PATENT DOCUMENTS

| | | | |
|---|---|---|---|
| 4,498,446 | 2/1985 | Judson | 123/557 |
| 4,640,284 | 2/1987 | Ruderian | 128/399 |
| 4,671,070 | 6/1987 | Rudick | 62/3 |
| 4,914,920 | 4/1990 | Carnagie et al. | 62/3.3 |
| 5,060,479 | 10/1991 | Carmi et al. | 62/362 |
| 5,092,395 | 3/1992 | Amidzich | 165/41 |
| 5,269,368 | 12/1993 | Schneider et al. | 165/46 |
| 5,377,495 | 1/1995 | Daigle | 62/125 |
| 5,588,480 | 12/1996 | Armanna, Sr. | 165/300 |
| 5,720,171 | 2/1998 | Osterhoff et al. | 62/3.6 |

*Primary Examiner*—Henry Bennett
*Assistant Examiner*—Mark Shulman
*Attorney, Agent, or Firm*—Robert L. Shaver; Frank J. Dykas

[57] ABSTRACT

A device for heating or cooling beverage containers, such as hot drinks or cold drinks, in a vehicle. A beverage container, such as a can of pop, is inserted into the device and its insertion activates the selected function, either heating or cooling. The beverage container may be inserted with one hand and removed with one hand, allowing it to be used safely by a driver. Heat transfer members within the device conform to the beverage container, and automatically adjust for different sizes of beverage container circumferences. The heat transfer members also automatically adjust themselves to accommodate varying top-to-bottom taper of beverage containers. A thermally conductive and pliable interface layer between the beverage container and the heat transfer members insures efficient heat transfer contact, and efficient heat transfer.

31 Claims, 13 Drawing Sheets

DEVICE FOR HEATING AND COOLING A BEVERAGE

BACKGROUND OF THE INVENTION

1. Field of the Invention

The present invention generally relates to beverage heaters and coolers, and more particularly to vehicle mounted beverage holders and heaters and coolers.

2. Background Information

There has long been a need for serving hot or cold beverages in a vehicle such as an automobile. In the past this has been accomplished by the use of insulated cups or cup holders, which maintain the temperature of the beverage inside the cup, whether it is hot or cold. Other devices also have been utilized, such as a resistance coil heater, which is immersed in the beverage, and which heats the beverage when power is supplied through the coil. Other devices have been add-ons to the vehicle heating or cooling system, so that air from the heating or cooling duct heats or cools one or more beverage cups before the air enters the passenger compartment of the vehicle. All of these methods have their drawbacks. Insulating type cup holders merely slow the equalization of temperature between the beverage and the ambient temperature of the passenger compartment of the vehicle. Eventually the coffee will become cool, and the pop will become warm. Systems which utilize active heating and cooling systems can be complicated, and may require more than one hand to place a container in the heater or cooler, and more than one hand to extract the container from the device. These devices are not safe for the driver to use, and are unhandy for passengers to use. Heaters or coolers which are based on the vehicle heating or cooling system require that the heater be on in order to heat a cup of coffee, and require that the air conditioner be on to cool a cold drink. The users of the vehicle may not want the heater or air conditioning on at that time. Also, if one person wants a hot drink and one person wants a cold drink, these systems require the heater to be used, followed by use of the air conditioner, which might not relate to these users' desires for air temperature in the vehicle.

Some of the drawbacks of these systems are solved in U.S. Pat. No. 5,060,479 to Carmi et al. In Carmi, a thermoelectric module is utilized to heat or cool a beverage placed in the device of Carmi. The thermoelectric module heats or cools a heat transfer mass, which has a concave surface, and into which a beverage container fits. However, Carmi has the disadvantage that the device is shaped to fit a particular circumference of container, and cannot adapt to different circumferences or different top-to-bottom tapers of a generally cylindrical container. Since the heat transfer mass is non-conforming, if a container had a ridge along its side, only the edge of the ridge would contact the concave surface, leaving an air gap between the rest of the container, and resulting in poor heat transfer. Carmi also has a locking closure which requires a two-step container insertion and withdrawal procedure, which could be considered unsafe and cumbersome in a motor vehicle context. If the device of Carmi is left on with no beverage in place, it will continue to heat or cool until it is turned off. In Carmi, air is blown through radiator fins in thermal contact with the thermoelectric module, to remove heat from the system.

Carnagie, U.S. Pat. No. 4914,920, also uses a thermoelectric module to heat or cool a beverage. The manner in which the beverage container is contacted by a heat transfer member, and how the contact is made is not fully described, except to say that a thermally conductive intermediate section of the housing is used to cool or heat the container. There is no mechanism in Carnagie to accommodate containers with differing circumferences or top-to-bottom tapers, or exterior ridges on containers. To use the device of Carnagie, the user has to insert a beverage into the device, select a heating or cooling mode, and turn the device on. Like Carmi, Carnagie uses air blown through a radiator connected to the thermoelectric module to remove heat from the thermoelectric module.

In Osterhoff et al., U.S. Pat. No. 5,720,171, a spring tab mechanism on one side of a beverage container pushes the beverage container into a heat transfer member shaped complimentary to a cylindrical beverage container. Although the spring tab of Osterhoff would work on containers with differing circumferences or top-to-bottom tapers, the heat transfer member has no mechanism for adapting for varying circumferences or top-to -bottom tapers, or for exterior ridges on containers. Like Carmi, Osterhoff uses air blown through a radiator connected to the thermoelectric module to remove heat from the thermoelectric module.

Each of these devices have some or all of the following drawbacks: the device requires a two-step procedure to insert the container, and activate the device, which may not be safe in a motor vehicle context; the device is shaped to fit a particular circumference of container, and cannot adapt to different circumferences or different top-to-bottom tapers of a generally cylindrical container; if a container had a ridge along its side, only the edge of the ridge would contact the concave heat transfer surface, leaving an air gap between the rest of the container and the heat transfer surface, thereby reducing efficiency and speed of heating or cooling; heat is removed from the thermoelectric module by air blown through a radiator connected to the thermoelectric module, which is less efficient than a liquid heat exchange system, and introduces heat into the vehicle interior; and the device is not adapted to heat containers with handles on the side.

Accordingly, it is an object of the invention to provide a device for holding beverage containers which is configured to self adjust for varying circumferences of the container and for varying top to bottom tapers of the container. This device for holding beverage containers stabilizes the container by the use of affirmative contact of the container contact member with the container side wall. The container contact members of this device intimately conform to the container side walls and provide active stabilization of the container. This device includes a sleeve which is filled with some type of medium, such as a liquid or a gel, and which presses against the container side wall, facilitating intimate contact with the beverage container, and adjusting for circumference in top to bottom taper. This sleeve can be of a generally cylindrical shape, and its surface material defines the medium in this generally cylindrical shape, and also defines an aperture for receiving the container. The sleeve can surround or partially surround the container, and engages the container in a frictionless engagement.

It is a further object to provide a device which can either heat or cool a beverage or other beverage container by the use of an active system, which is independent from the vehicle's heating and cooling system.

Another object of the invention is to provide a beverage heater or cooler which is activated by a switch, or by the insertion of a beverage container. Conversely, removal of the beverage container can deactivate the device.

A further object of the invention is to provide a beverage heater or cooler which has a heat transfer member which easily and automatically adjusts for different circumferences of containers, different top-to-bottom taper of containers, and for ridges in the outer surface of the container, while conforming to container shape and maintaining intimate contact.

It is a further object of the invention to provide a heating or cooling device into which a beverage or beverage container may be placed in one step and with one hand, and which would be safe for a driver of a vehicle to use while driving.

It is a further object of the invention that a container placed in this heating or cooling device is securely locked in place during heating or cooling, but can be released by lifting the container out of the device, or by pushing the container into the device to activate a release mechanism, either of which action can be accomplished by the use of one hand.

A further object of the invention is to provide a beverage heater or cooler which can accommodate beverage containers with handles on the side of the container.

Additional objects, advantages and novel features of the invention will be set forth in part in the description as follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention accomplishes the foregoing and other objects and advantages by a device for holding beverage containers which have one or more container contact members, and in which each container contact member is configured to self adjust for varying container circumferences, and for varying top to bottom tapers, in order to maintain contact with and support the container side wall. A container can have and positive taper, in which the base of the container is smaller than the top rim, a negative taper in which the base of the container is larger than the top rim of the container, or it can have a neutral taper, in which the base is equal in diameter to the top rim of the container. This device for holding beverage containers has a way of maintaining affirmative contact of the container contact members with the container side wall. The container contact members intimately conform to the container side walls, for effective stabilizing of the container. This is accomplished by a pliable sleeve which is filled with some type of medium. The medium can be a liquid, such as ethylene glycol, or a gel. This medium-filled sleeve facilitates intimate contact with the beverage container. This medium is self-conforming to the container side wall by means of a flexible and pliable surface material, and is contained in a generally cylindrical shape by a surface material. The generally cylindrical shape forms an aperture or opening for receiving a container, and the sleeve can surround or partially surround the container. A container can be inserted into this self-adjusting container holder in a frictionless engagement. By this it is meant that the container does not slide across the container contact member. The container contact member engages the sides of the container, and descends with the container as the container is pressed into engagement with the device.

Another version of the device includes one or more thermal transfer members and provides for the cooling of the container and its contents. In this version, each thermal transfer member is concave on a side facing the container, and configured or articulated to adjust and conform for varying contours, circumferences, and top-to-bottom tapers of the containers. The thermal transfer members self adjust for the beverage container circumference and for the top-to-bottom taper of the beverage container. This configuration or articulation for self adjustment maintains intimate heat transfer contact and support of the container. Each thermal transfer member includes one or more thermal transfer plates. Each thermal transfer member also includes a means of maintaining affirmative contact of said thermal transfer member with a container. Each heat transfer plate is thermally communicated to a heat transfer member, and removes heat from the container. Each thermal transfer member also includes a means of removing heat from the heat transfer member, and a means of maintaining intimate contact between the thermal contact members and the container.

In accordance with another aspect of the invention, the device also includes a means of heating a container by adding heat across the heat transfer plate. This version of the device includes a switch or a cooling and heating function selection device, by which the user can select either a cooling function or a heating function for the device.

Both of the above described aspects of the invention can be powered by conventional refrigeration or heating systems, or by a thermoelectric module. This is a semiconductor device, to which electrical power is supplied to a positive and negative pole. The device has a heat transfer plate. When power is applied to the thermoelectric module, charge carriers within the device absorb heat from one side of the heat transfer plate and release this heat on the opposite side of the heat transfer plate. Although present technology requires the use of DC power, such DC power can originate from an AC power supply which is converted to DC. This device would work equally well with a thermoelectric module which could utilize AC power directly. A heat transfer medium is incorporated into the device which transfers heat between the heat transfer plate and the beverage container. Also included is a means of sensing the temperature of the contents of the container. A means of regulating the thermoelectric module in relation to the means of sensing temperature is provided, so that a chosen temperature of the beverage container can be maintained. Also included in this device is a second or secondary heat transfer medium which removes or adds heat to or from the heat transfer plate. The device also includes a means of activation, such as an on/off switch. One type of means of activation is when the device is activated by the insertion of a beverage container. Thus, the device can be activated by the insertion of a can of pop, or by a coffee cup. In such a configuration, the insertion of a beverage container which is recognized as a cold beverage activates a cooling function in the device. The insertion of a cup which is recognized as a container for carrying a hot beverage activates a heating function. Conversely, the device of this configuration can be deactivated by the removal of a chosen beverage container. Activation and selection of a heating or cooling function can be by sensing the insertion of a container and recognizing its temperature. Thus, insertion of a cool beverage would activate the device in a cooling mode, and insertion of a warm device would activate the device in a heating mode.

One version of this device can have the thermal transfer members form a generally cylindrical sleeve which surrounds or partially surrounds a beverage container.

In the version of the device which utilizes a thermoelectric module for heating and cooling, the heat exchange system which removes or adds heat to the heat transfer plate is a liquid or a gas.

This device can be enclosed within a housing, which can also include multiples of this type of device. One device may be set to heat, while another neighboring device may be set to cool. The housing includes a container support base, and an access opening for introducing and removing the beverage container. It also includes an upper rim and a lower housing tube, which is generally cylindrical, and which both define a slot for receiving a handle of a cup, and the access opening.

The way of maintaining affirmative contact between the thermal transfer members and the container can be by a tension device. This device can be spring loaded, or of a shock absorber type, and mounted on one end to the lower housing tube of the housing, and mounted at the other end on the heat transfer members. A spring contained within the tension device presses the heat transfer members away from the housing. The heat transfer members are also free floating and hinged on the tension device, which allows the top or bottom of the heat transfer members to rotate in or out to compensate for varying circumferences of containers and also for varying top-to-bottom taper of containers. The means of maintaining contact between the thermal transfer members and the container is also facilitated by a flexible and pliable interface surface on the side of the thermal transfer member which faces the container. This pliable interface surface conforms itself to contours of the container in order to maximize surface contact and provide more efficient heat transfer, by a flexible and conforming surface with a resilient under surface. The thermal transfer members can further include a chamber for holding heat transfer medium. The heat transfer medium is preferably a liquid, such as ethylene glycol, but can be a gel also. The heat transfer medium transfers heat between the heat transfer plate to the interface surface. The medium filled chamber being filled with a fluid also contributes to its shape conforming properties and makes for better heat transfer. The medium adds resiliency and forces the interface surface against the container by internal pressure, and causes it to conform intimately to the container wall.

The interface surface can conform to the container side walls by the use of a pliable gasket which is filled with a medium, such as a liquid or a gel, and which is located behind the interface surface. This pliable gasket has a means of equalizing the internal pressure of the medium. The internal pressure of the medium provides resilient force to cause intimate contact between the interface surface and the container wall. The housing of this device can include a slot for receiving the handle of a container.

The heat exchange system of this device includes a radiator section, a way to remove heat from the radiator section, and the secondary heat removal medium. The device can be constructed so that the insertion of a certain size or shape of container, normally recognized as configured for containing cold beverages, activates the cooling function in the device. Similarly, insertion of a container normally associated with the configuration for heated beverages, can activate a heating function. This sensing of container type can be based on container shape, such as a canned pop shape activating a cooling function, and a tapered or handled shape activating a heating function. Activation can also be triggered by beverage temperature, with a cool beverage activating the cooling function and a warm beverage activating the heating function. The container is inserted into this device in a frictionless engagement. By this is meant that as the container is inserted into the device, the thermal transfer members engage the walls of the container and accompany the container into the device as the container is pressed into the device. There is no sliding contact between the thermal transfer members and the container side walls.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawing and description are to be regarded as illustrative in nature, and not as restrictive.

DESCRIPTION OF THE PREFERRED EMBODIMENTS

Figure 1:
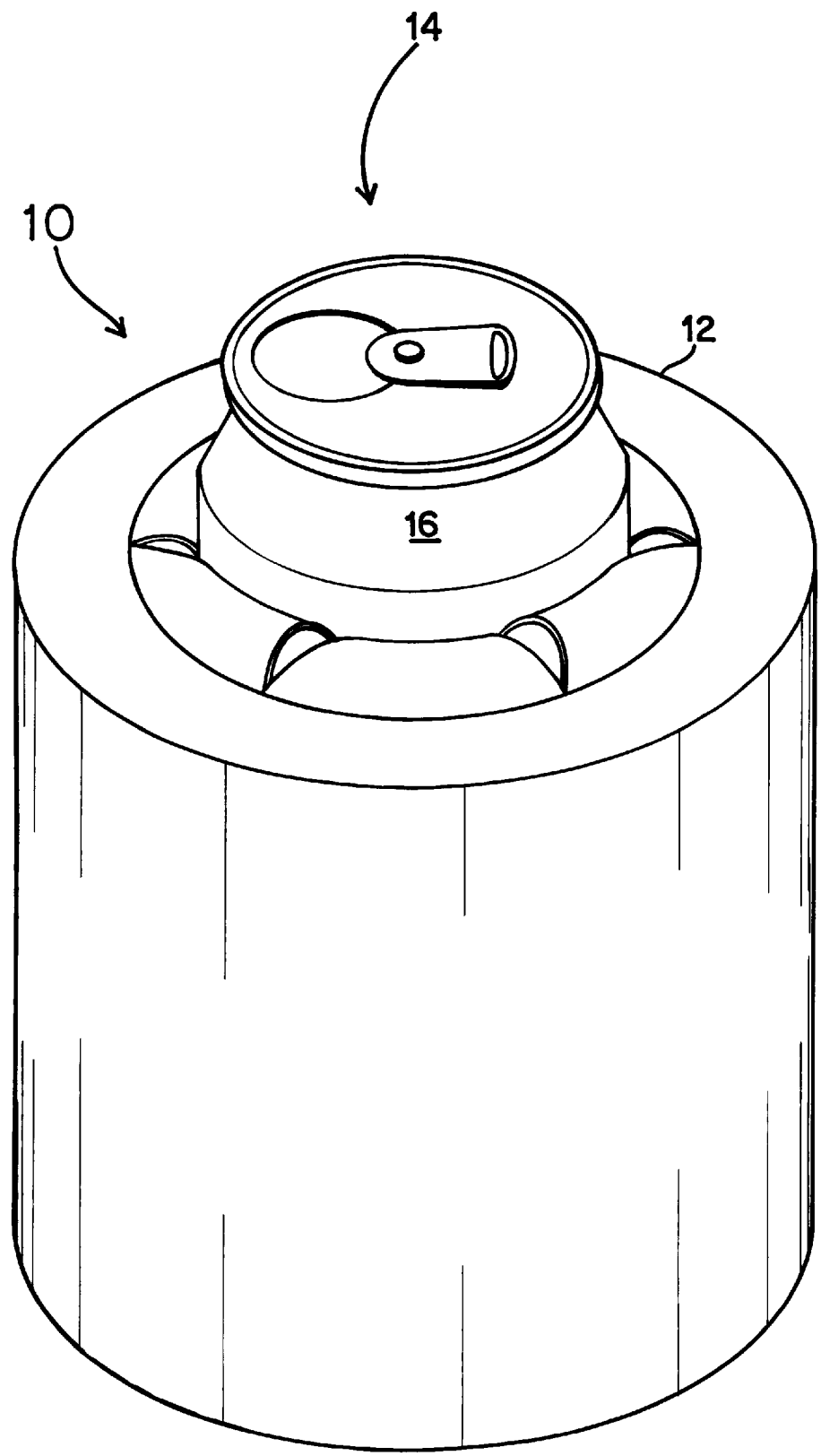
FIG. 1 is a perspective view of the beverage holding device with a beverage container enclosed.

The preferred embodiments of the invention are shown in FIGS. 1–13. FIG. 1 is a perspective view of one preferred embodiment of the device. Referring to FIG. 1, the heating and cooling device 10 is shown. The heating and cooling device 10 includes a housing 12, an aperture 14, and an entry membrane 16. A beverage container 18 is shown in the heating and cooling device 10.

Figure 2:
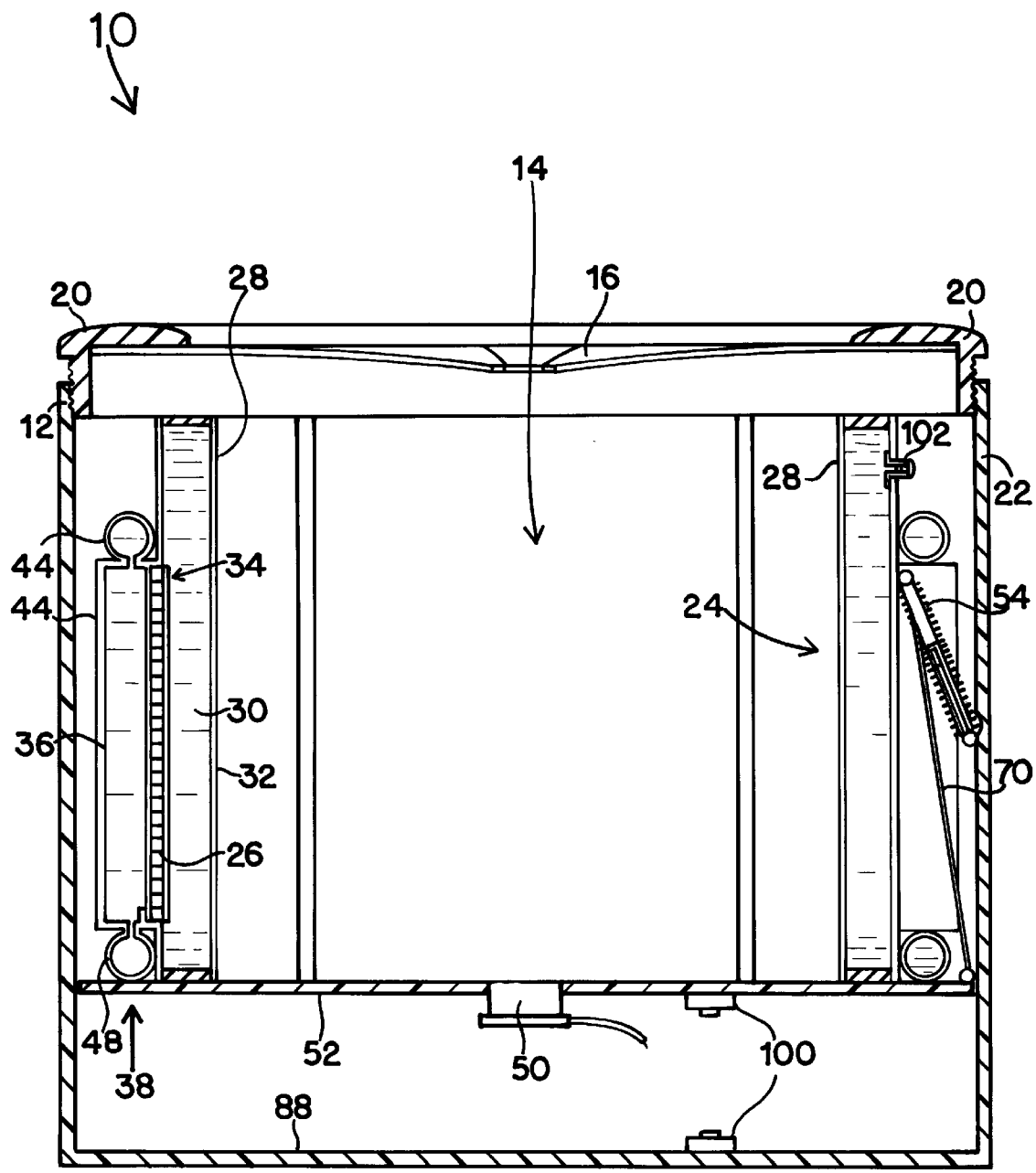
FIG. 2 is a cross-sectional side view of the heating and cooling device in the empty position.
Figure 3:
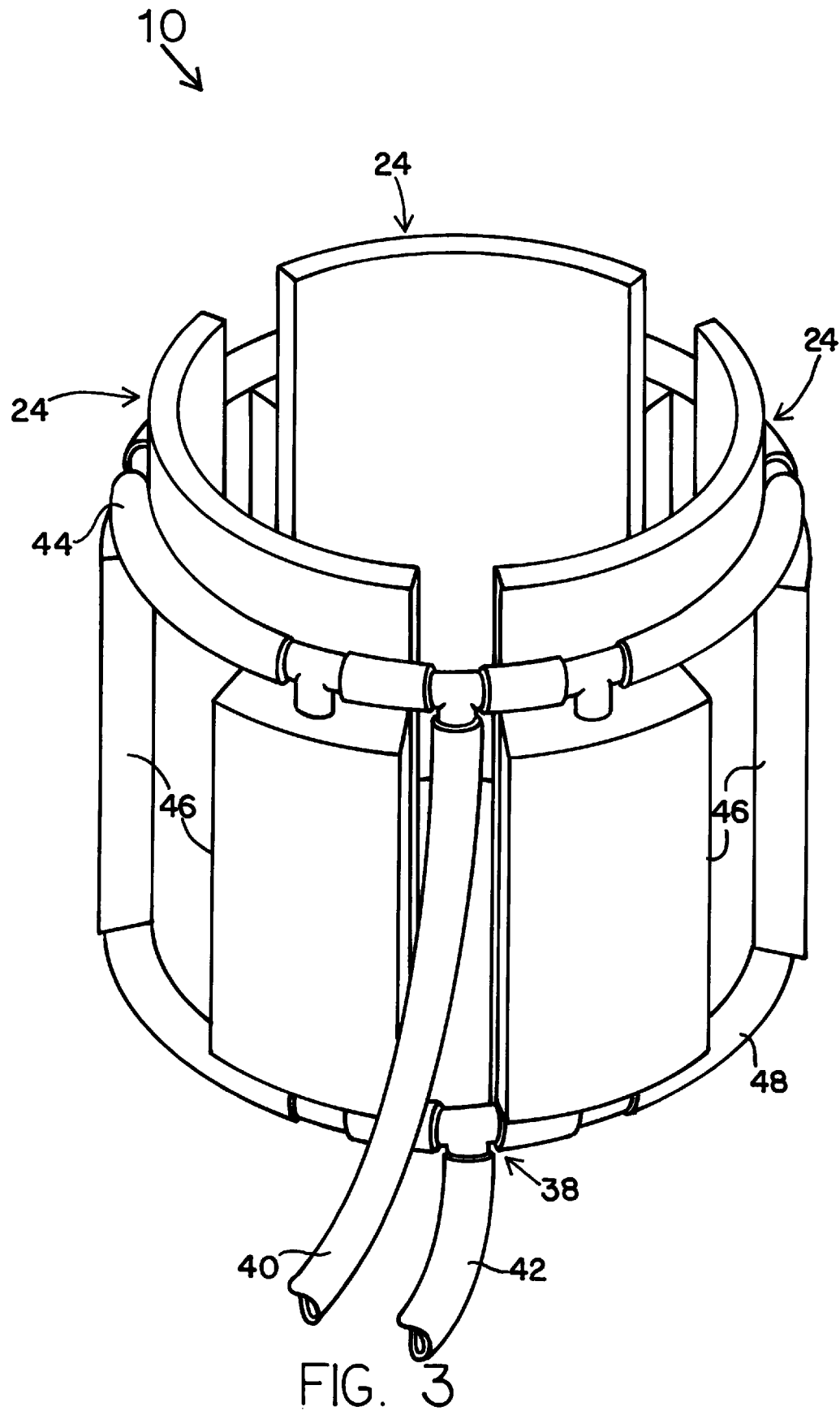
FIG. 3 is a perspective view of the heating and cooling device with the housing removed.

FIG. 2 shows a cut-away side view of the heating and cooling device 10. The housing includes a screw-on rim 20, and a generally cylindrical lower housing tube 22. The housing contains a container support base 52 and a housing floor 88. As shown in FIGS. 1 and 2, entry membrane 16 generally seals off aperture 14 from the flow of hot or cold air from within the heating and cooling device 10. It is also partially divided into trapezoidal sections, which facilitate the entry of a beverage container 18 into the aperture 14. The heating and cooling device 10 also includes heat transfer members 24, as best seen in FIGS. 2 and 3. In the best mode of the invention, the heating and cooling device 10 includes three heat transfer members.

As seen in FIG. 2 in cross section, each heat transfer member 24 includes a medium filled chamber 28, a heat transfer medium 30, a pliable interface surface 32, a gasket (not shown) between heat transfer medium 30 and interface surface 32, a pressure release valve 102. The thermoelectric module 34 includes a heat transfer plate 26. Connected to the thermoelectric module 34 and the heat transfer plate 26 is a secondary heat transfer system 38 which contains a secondary heat transfer medium 36. The secondary heat transfer system 38 includes input tube 40 and output tube 42, best seen in FIG. 3. Input tube 40 carries secondary heat transfer medium 36 to an upper manifold 44, which in turn distributes the secondary heat transfer medium 36 to secondary medium filled chambers 46.

Secondary medium filled chambers 46 are connected to a lower manifold 48. The lower manifold 48 is connected to output tube 42. Also included in the heating and cooling device is a temperature sensor 50, which provides a means of sensing the temperature of the contents of the beverage container 18. In the preferred embodiment the temperature sensor is spectral wave temperature sensing. However, other types of temperature sensing could be utilized, such as a thermocouple or bimetallic strip.

Figure 4:
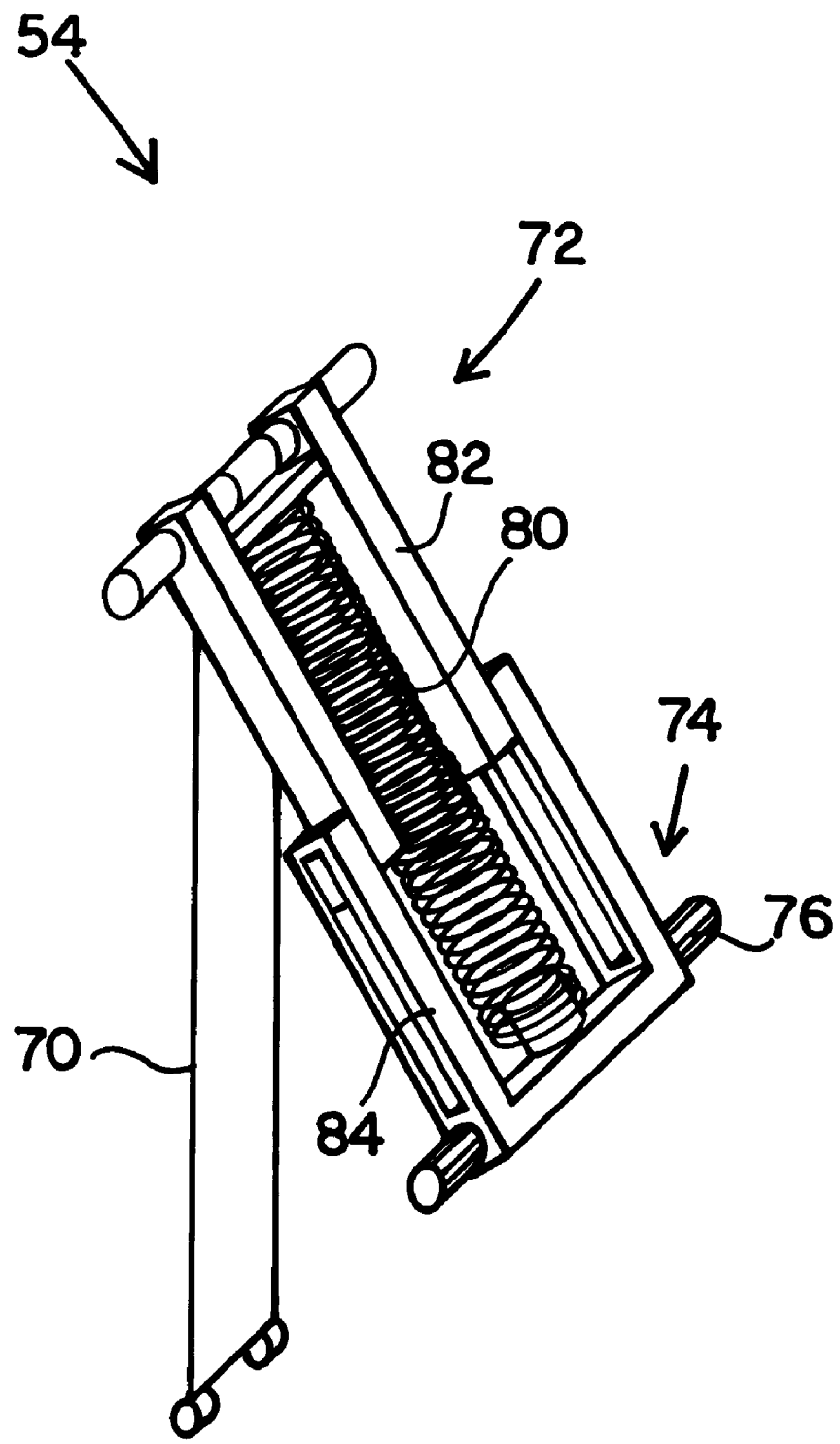
FIG. 4 is a perspective view of the tension device.

Each heat transfer member 24 also includes at least one tension device 54, which is shown in more detail in FIG. 4. The lower end 74 of the tension device 54 is attached to lower housing tube 22, and rotates about lower axle 76. Upper axle 78 is rotatably attached to a heat transfer member 24, and as it is pulled away from lower housing tube 22, forces the heat transfer member 24 to which it is attached away from lower housing tube 22. The spring 80 of tension device 54 allows the upper U-shaped section 82 of tension device 54 to slide into the lower U-shaped section 84 of the tension device 54. In this manner, heat transfer members 24 are pressed away from lower housing tube 22, and make contact with the beverage container 18.

The thermoelectric module 34 is exemplified by thermoelectric modules made by Telurex, Inc. In this type of device, semi-conductor pellets are doped positive or negative. Pairs of pellets are connected electrically in series and are thermally in parallel. When DC voltage is applied to the module, positive and negative charge carriers in the semiconductor material absorb heat energy on one substrate surface and release it on the opposite surface. The surface where heat energy is absorbed becomes cold. The opposite surface where heat energy is released becomes hot. By reversing the flow of electricity through the module, heat is absorbed from the opposite side, and released on the opposite side.

Figure 5:
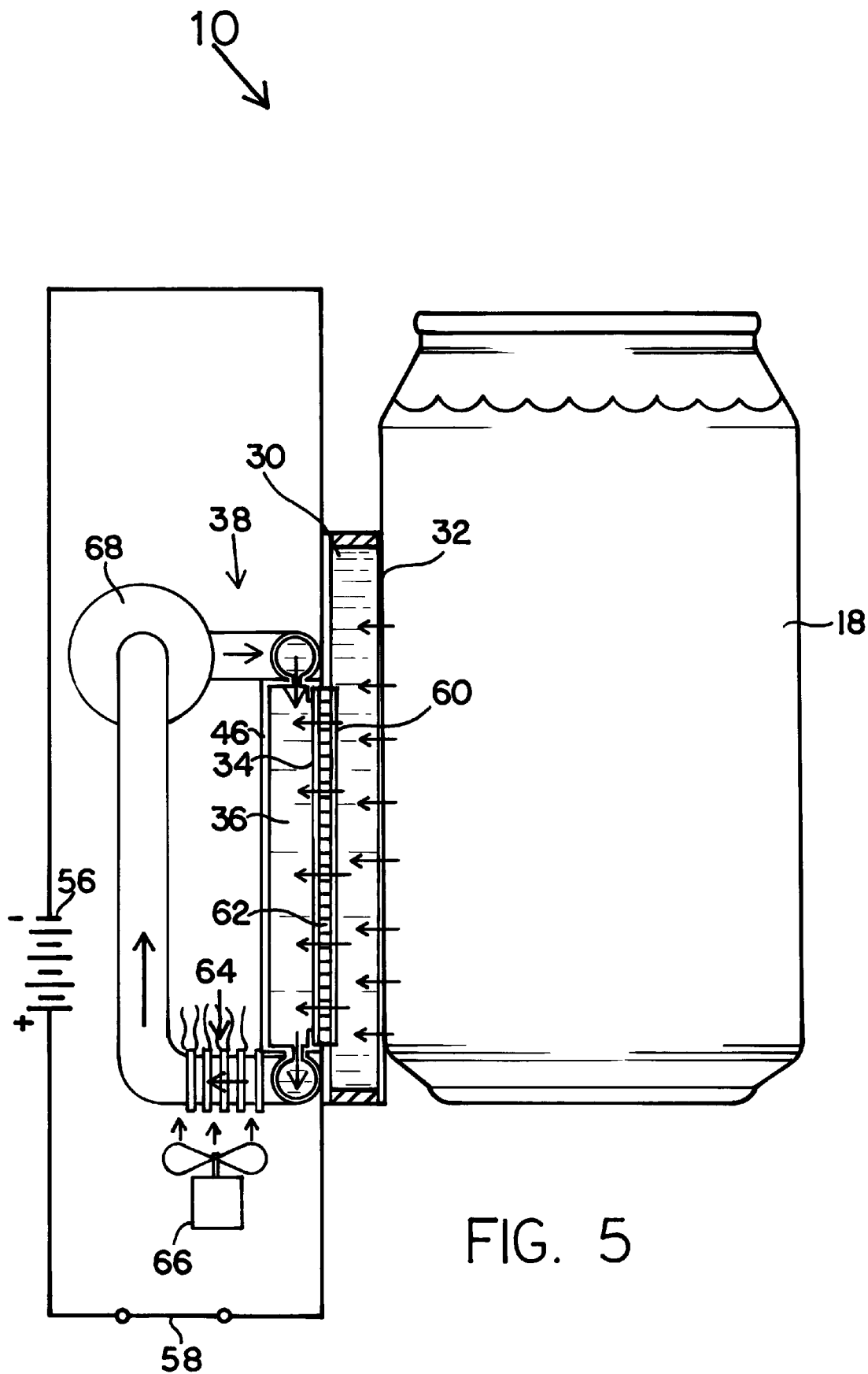
FIG. 5 is a schematic cross-sectional view of the heating and cooling device configured to cool a beverage container.
Figure 6:
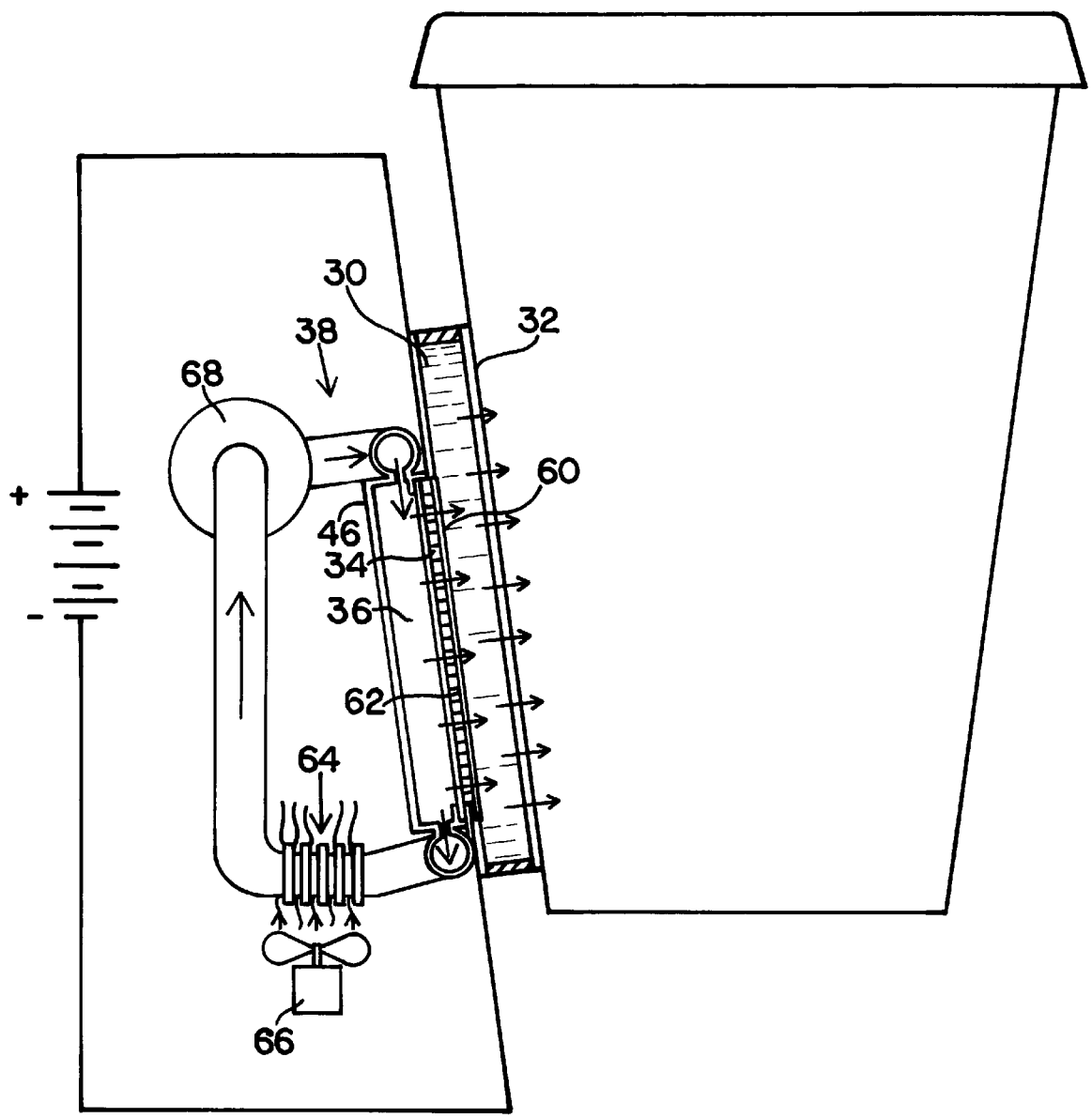
FIG. 6 is a schematic view of the heating and cooling device configured to heat a beverage container.

These thermoelectric modules are utilized in the heating and cooling device 10 as shown in FIGS. 5 and 6.

Figure 11:
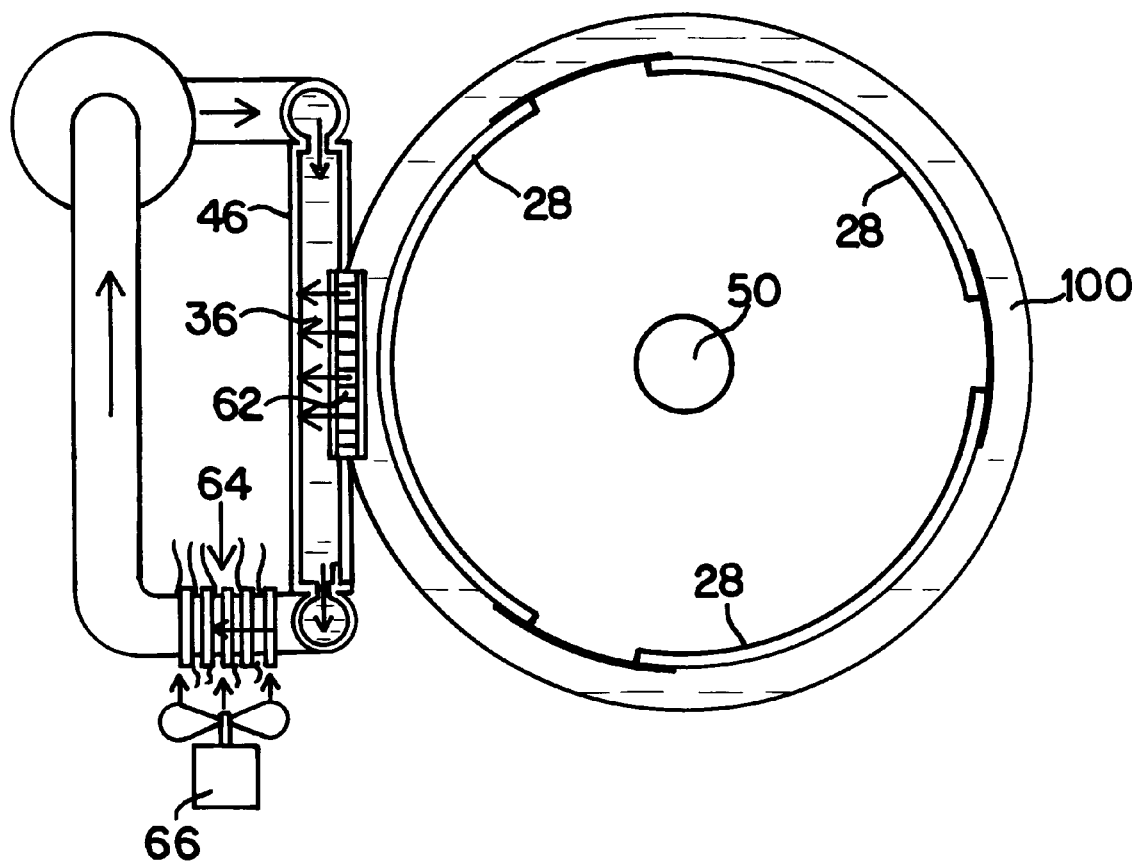
FIG. 11 is a schematic view of the heating and cooling device with a sleeve like heat transfer member, configured to heat or cool a beverage container.

FIG. 5 shows a heating and cooling device 10 configured to remove heat from a beverage container 18. This system includes a power source 56, which in this case is a DC battery. AC power could also be utilized, however, by converting it to DC or directly, when modules are available with this ability. The system also includes a switch 58, which is regulated by a thermostat (not shown), which operates based on temperature information from temperature sensor 50. Power from the power source 56 is routed to either side of the thermoelectric module 34. In this configuration, charge carriers in the thermoelectric module 34 absorbs heat energy from side 60 of the thermoelectric module 34, and release this heat energy on side 62 of the thermoelectric module 34. The heat which is absorbed on side 60 comes from heat transfer medium 30, which is contained in medium-filled chamber 28. The heat transfer medium 30 can be a variety of materials, but in the best mode, a solution of ethylene glycol is preferred. Other solutions with similar characteristics could be equally utilized as heat transfer medium 30. As heat is removed from heat transfer medium 30, it becomes very cold. Since it is in thermal contact with beverage container 18, and the interface between beverage container 18 and the heat transfer medium 30 is interface surface 32, which is very conductive of heat, the cold heat transfer medium 30 also removes heat from the beverage container 18. Heat which is removed by the thermoelectric module 34, is released into the secondary heat transfer system 38 and its secondary heat transfer medium 36. In the preferred embodiment, the secondary heat transfer medium 36 is a liquid, preferably a solution of ethylene glycol, but any other suitable liquid or gas would work. The secondary heat transfer medium 36 is circulated to a radiator section 64, where excess heat is removed. This can be by the use of a fan 66, or by release of the heat into ambient air. From the radiator section 64, the secondary heat transfer medium is routed to a circulator 68. If the secondary heat transfer medium 36 is a liquid, the circulator 68 will be a pump which is capable of pumping liquids. If the secondary heat transfer medium 36 is a gas, then the circulator 68 will be a fan 66. From the circulator 68, secondary heat transfer medium 36 returns to a secondary medium filled chamber 46 to pick up more heat from the heat transfer plate 26 of the thermoelectric module 34. FIG. 6 shows the system reconfigured to add heat to beverage container 18. This system works in the same manner as the system shown in FIG. 5, but the polarity of the battery is reversed, and the thermoelectric module 34 absorbs heat from side 62 and releases heat on side 60. The radiator section 64 serves to add heat to the secondary heat transfer medium 36. FIG. 11 is a schematic view of the heating and cooling device with a sleeve-like heat transfer member, configured to heat or cool a beverage container.

Temperature sensor 50 is preferably a temperature sensor utilizing spectral wave temperature sensing. However, other types of temperature sensing could be utilized, such as a thermocouple or bimetallic strip.

In one preferred embodiment of the device, the heating and cooling device is activated by the insertion of a food container 18. In a preferred embodiment of this type of device, when a beverage container 18 is inserted into the device 10 and is identified as a generally cold beverage containing shape, the device 10 would automatically activate in the cooling mode. Similarly, if a container 18, as shown in FIG. 6, which is generally identified with hot beverages is inserted, the device is activated in the heating mode. This hot/cold switching can be activated by container shape, by the presence of a handle, by beverage temperature, other clues. If designed to activate based on beverage temperature, insertion of a cool beverage activates the device in a cooling mode, and insertion of a warm beverage activates the device in a heating mode. A manual switch could be available to override this automatic mode selection of the device.

Figure 8:
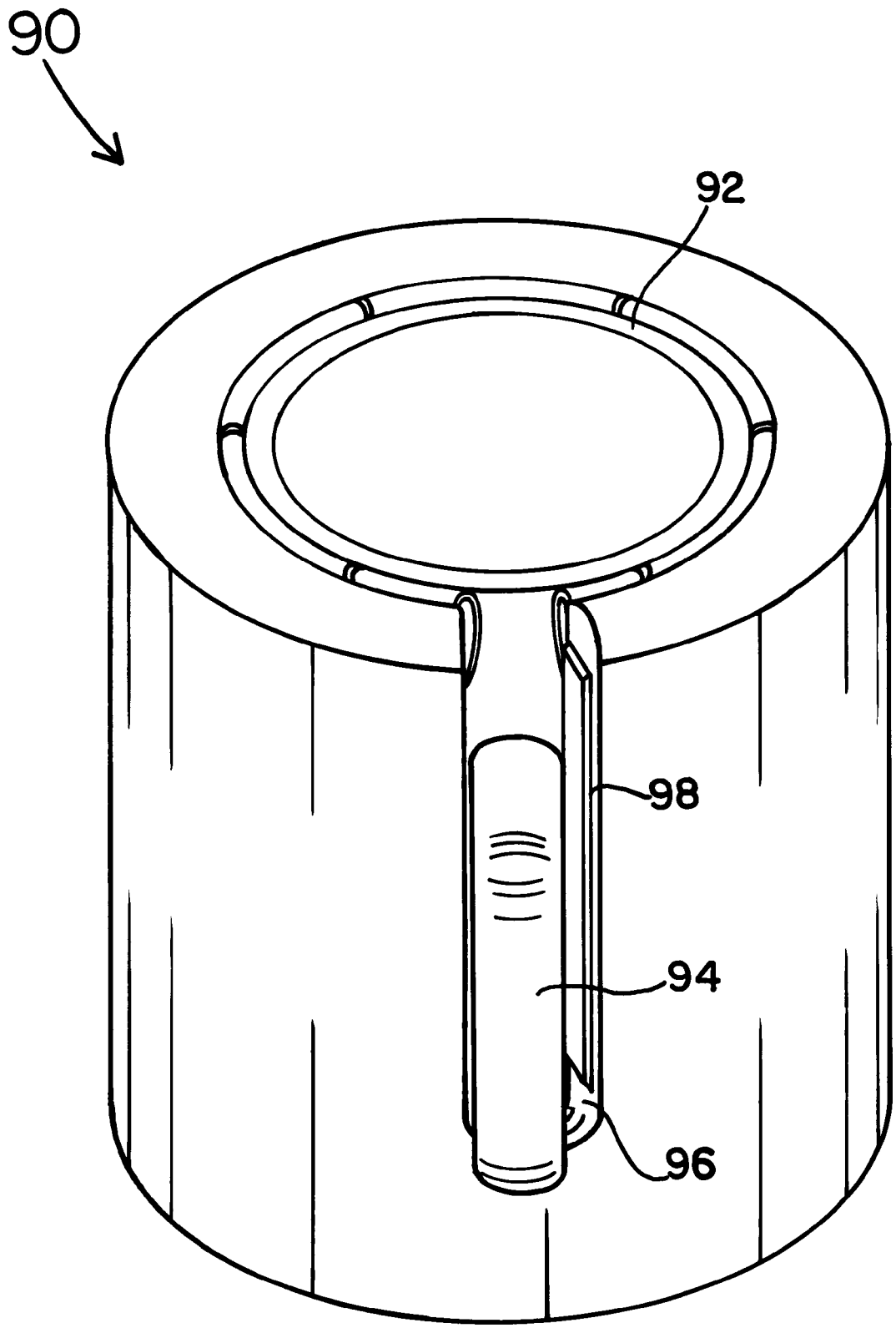
FIG. 8 is a perspective view of the heating and cooling device in a configuration which accepts the handle of a cup.
Figure 9:
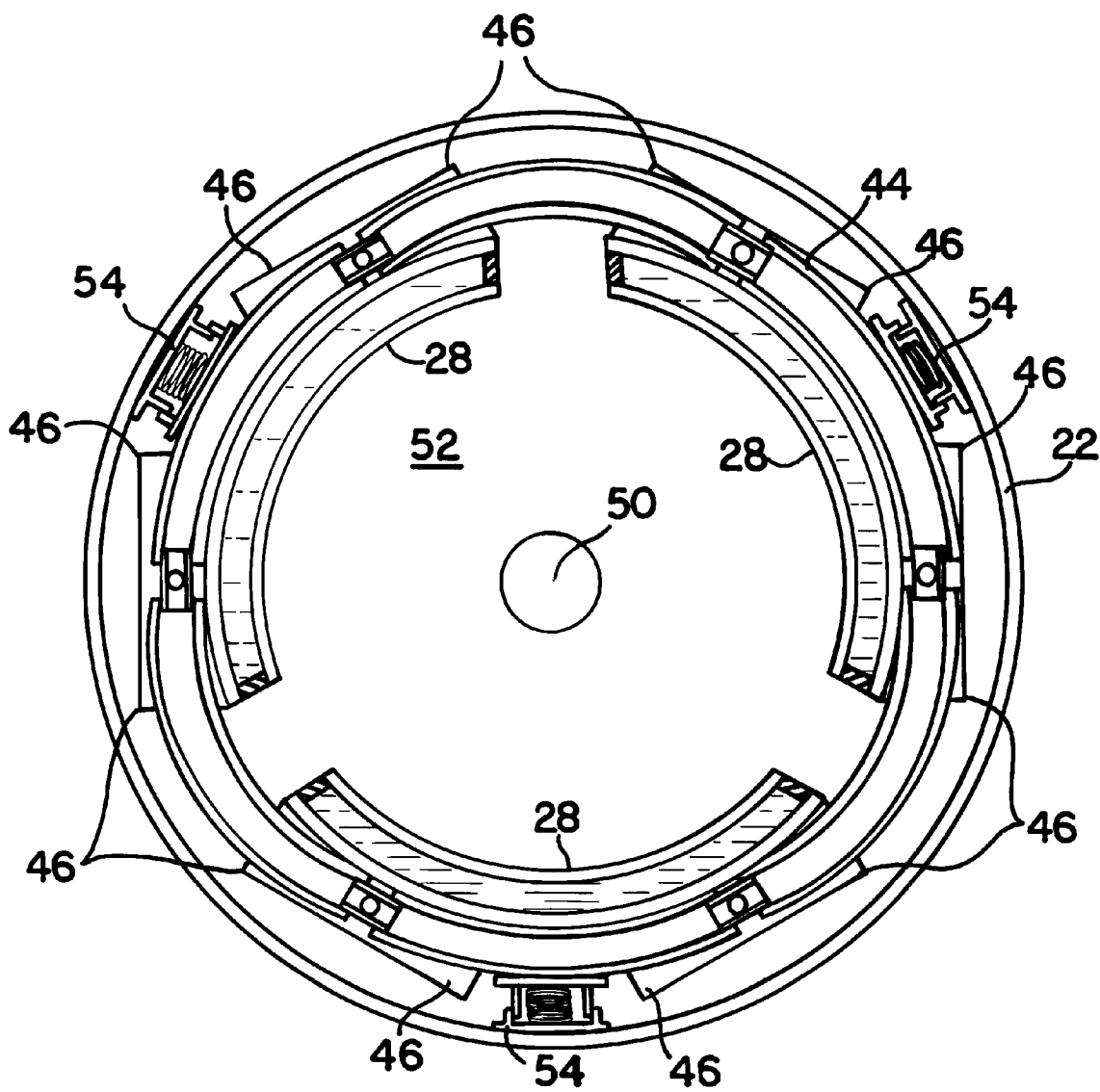
FIG. 9 is a cross-sectional top view of a heating and cooling device showing the components of the heat transfer members.

FIG. 8 shows a preferred embodiment 90 of the device, which is configured to accommodate a handle of containers. In FIG. 8, a container 92 is inserted into the device 90 and the handle 94 of the container 92 fits in the slot 96 in the housing of the device.

Figure 7:
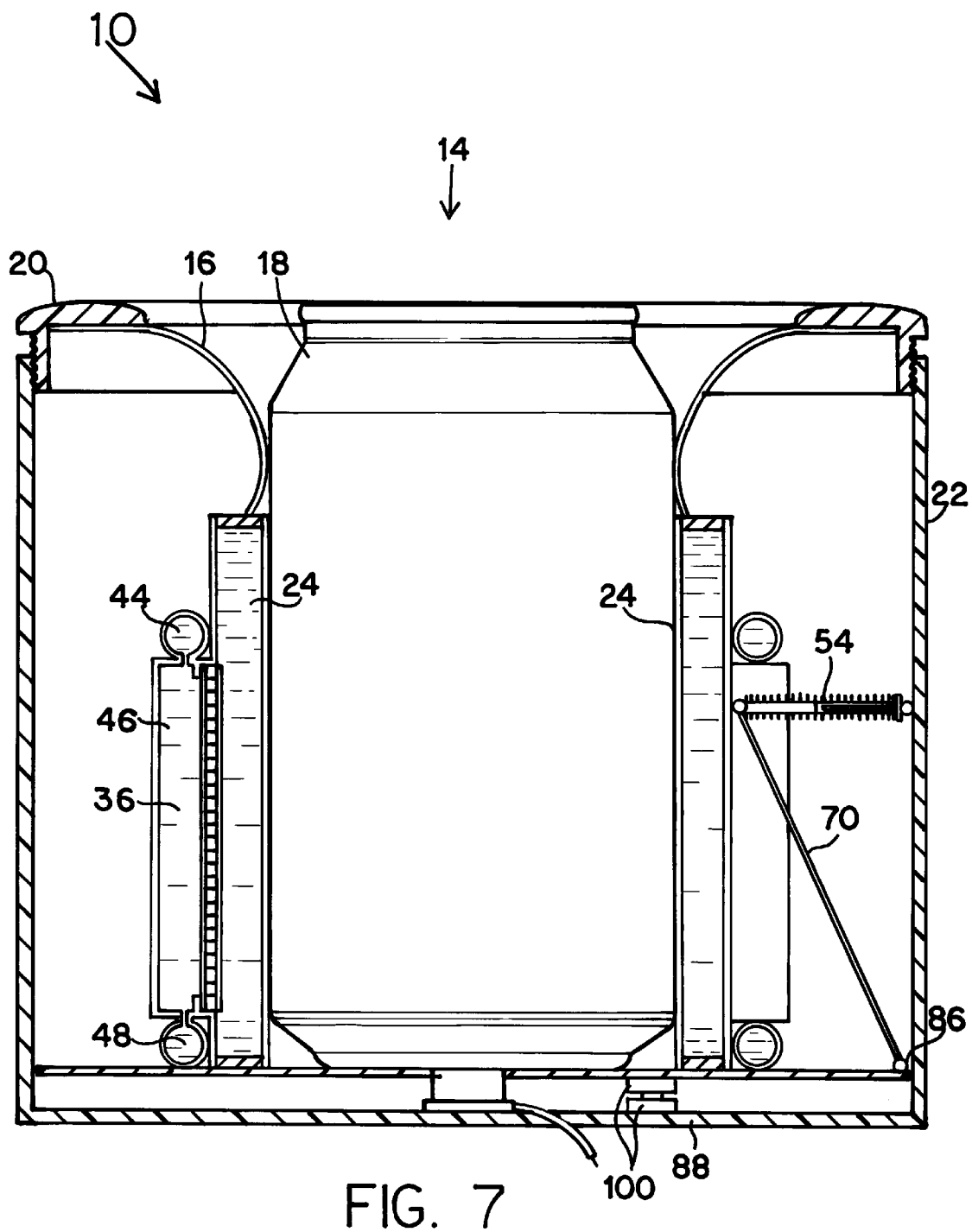
FIG. 7 is a cross-sectional side view of a heating and cooling device containing a beverage container in an in-use position.

Another preferred embodiment of the invention is a device for holding beverage containers, which is configured to self adjust for the container circumference and top to bottom taper of the containers. This device has container contact members, rather than thermal transfer members, and is configured as shown in FIGS. 1, 2 and 7, but is configured to hold and stabilize the container rather than heat or cool it. The means of maintaining affirmative contact with these container contact members and the container side wall is as shown in FIGS. 2 and 7, utilizing a tension device.

Figure 10:
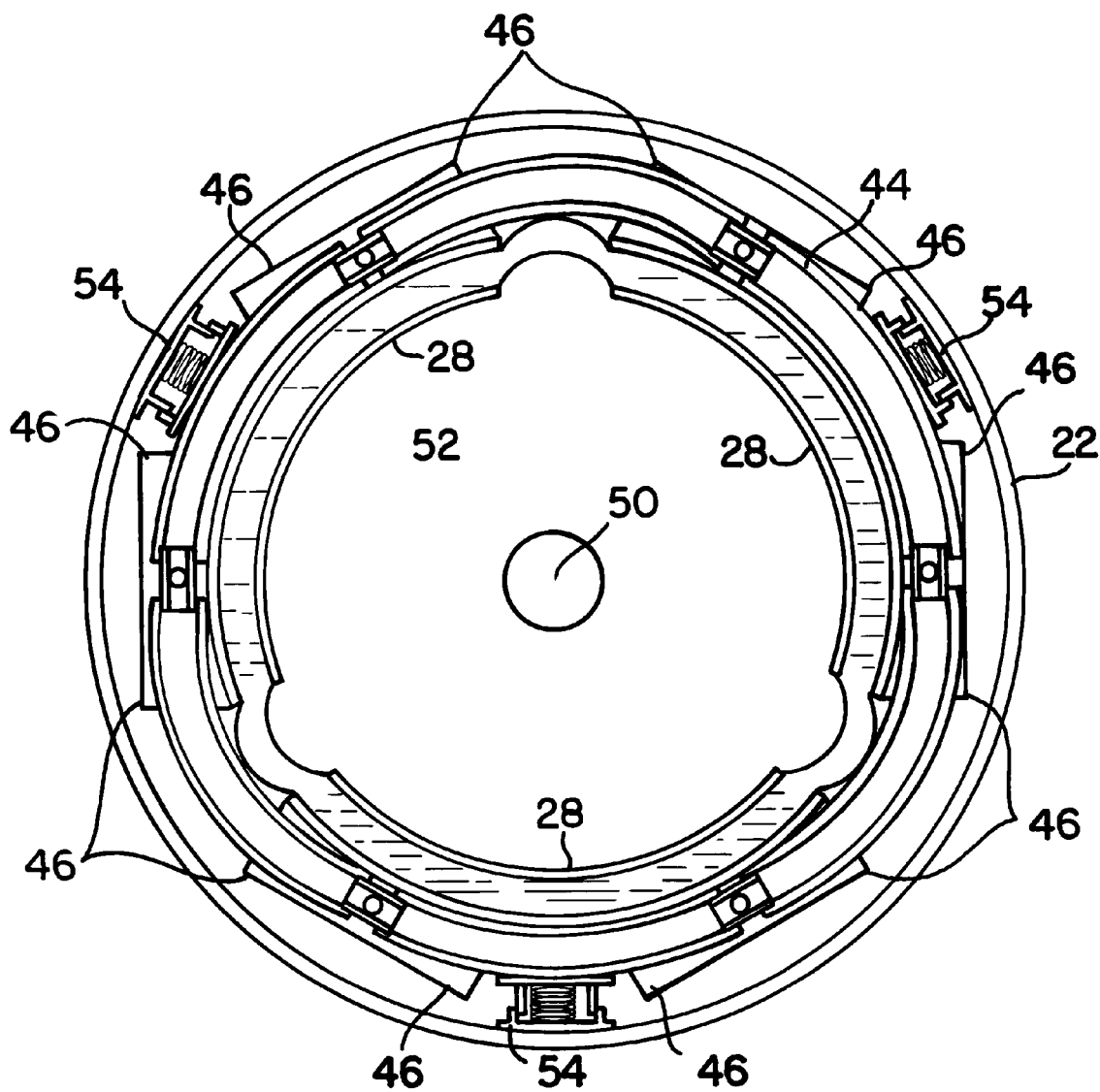
FIG. 10 is a cross-sectional top view of a heating and cooling device in which the heat transfer member is sleeve-like, and surrounds the container.

Another preferred embodiment of the invention is shown as FIGS. 10 and 11. In this embodiment, the container contact member 100 can be configured as a cylindrical sleeve, which surrounds or partially surrounds a beverage container. In the embodiment shown in FIGS. 10 and 11, the container contact member 100 is configured as a sleeve, and also serves as the thermal transfer member 28. The thermo-electric device 34 is in contact with a medium, a liquid or a gel, preferably, contained within the container contact member 100 or the thermal contact member 28. As shown in FIG. 10, in this configuration the thermal contact member 28 is connected to tension device 54, and contacts the beverage container 18 as the beverage container is inserted into the device 10. In this way, even when the thermal transfer member 28 is configured as a sleeve filled with a medium, contact with the container and insertion with the container into the device 10 is frictionless.

In use, the heating and cooling device 10 would typically be mounted in a vehicle, such as an automobile, RV, boat, or plane. A typical installation would be in an arm rest, a center console, in a dashboard, or in a swing-out tray. The initial position of the heating and cooling device would be as shown in FIG. 2, with the container support base 52 and its attached heat transfer members 24 in a raised position. A beverage container 18 is inserted into the aperture 14 and pressed downward. This manner of insertion of a beverage container allows the operator to use only one hand, and a driver need not take his eyes off the road while performing this operation. Beverage container 18 is pressed downward until it contacts container support base 52, and beyond. As container support base 52 is pressed downward, strut 70 of tension device 54 pulls the upper end 72 of tension device 54 away from the lower housing tube 22. Tension device 54 is best shown in FIG. 4. The lower end 74 of the tension device 54 is attached to lower housing tube 22, and rotates about lower axle 76. Upper axle 78 is rotatably attached to a heat transfer member 24, and as it is pulled away from lower housing tube 22, forces the heat transfer member 24 to which it is attached away from lower housing tube 22. The spring 80 of tension device 54 allows the upper U-shaped section 82 of tension device 54 to slide into the lower U-shaped section 84 of the tension device 54. In this manner, heat transfer members 24 are pressed away from lower housing tube 22, and make contact with the beverage container 18. As beverage container 18 continues downward, the contact between beverage container 18 and heat transfer members 24 forms a non-sliding, that is frictionless contact, and the heat transfer members 24 follow the beverage container 18 until it touches the housing floor 88. This position is shown in FIG. 7. This manner of contact and conformation of thermal transfer members 28 and the container 18 results in intimate thermal contact, regardless of container contour, circumference, or top-to-bottom taper. The thermal transfer member 28 conforms by its surface layer deforming to fit contours of the container, by the thermal transfer member 28 changing its radial spacing from a vertical line in the center of the housing, and by changing its angle from the vertical to accommodate differing top-to-bottom tapers. Thus the thermal transfer members 28 are articulated in two axes, and also conform by a deformable surface structure.

Figure 12:
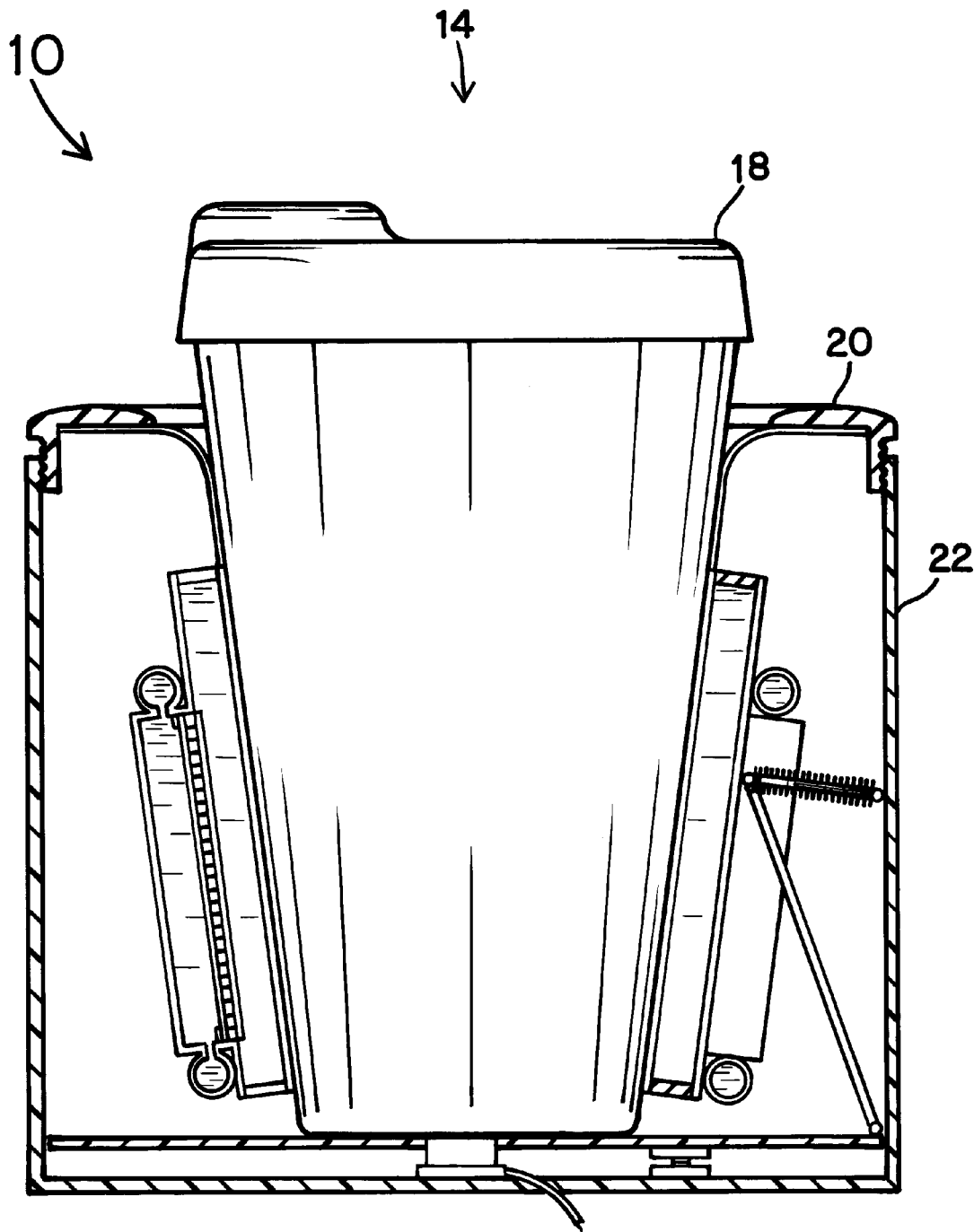
FIG. 12 is a cross-sectional side view of a heating and cooling device containing a tapered beverage container in an in-use position.
Figure 13:
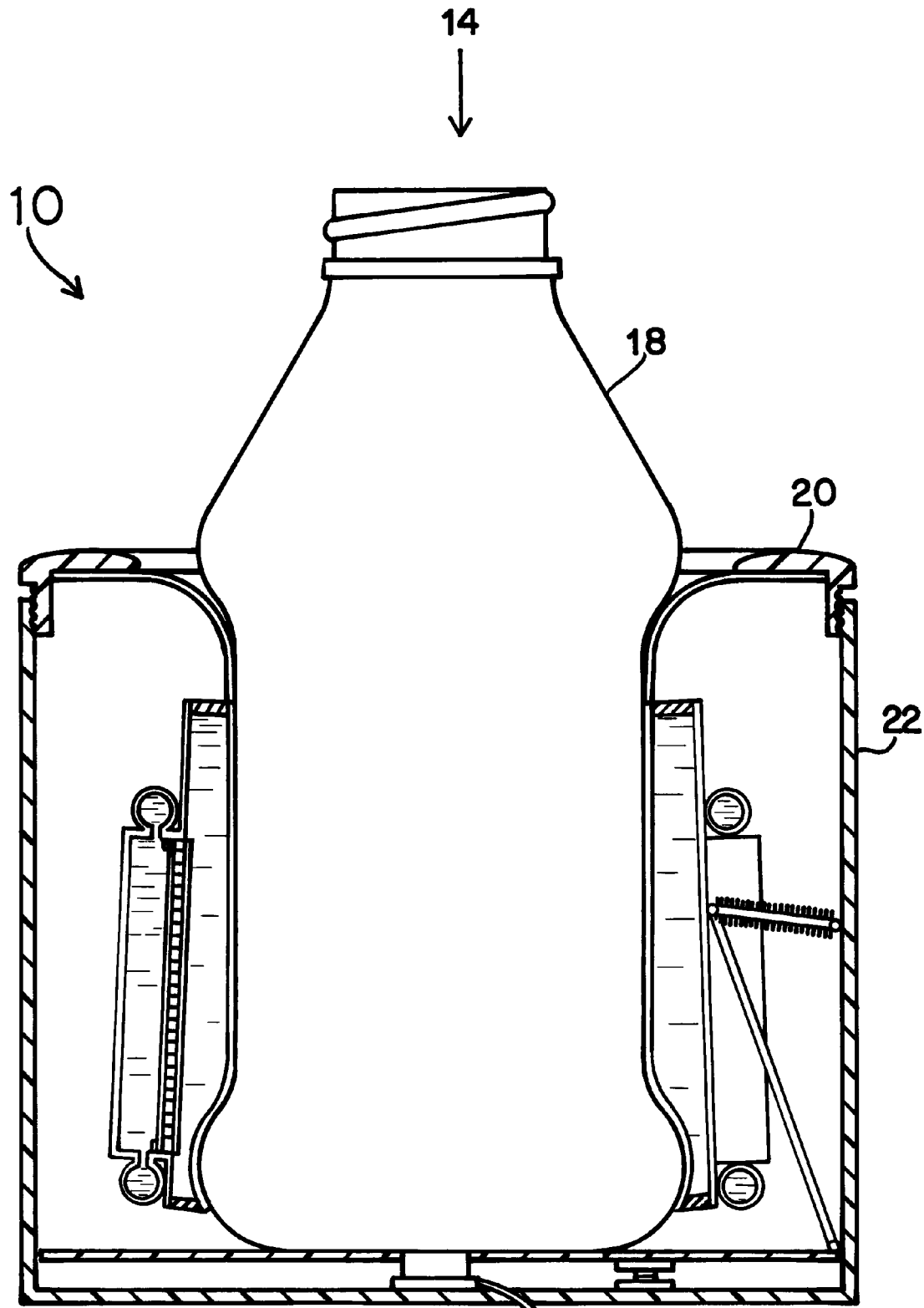
FIG. 13 cross-sectional side view of a heating and cooling device containing a beverage container with ridges in an in-use position.

In one preferred embodiment, that shown in FIG. 8, a slot 96 is available for receiving the handle 94 of a container 92. In one embodiment using this slot, when a container 92 with a handle 94 is inserted into the device 90, a handle sensor 98 is depressed by the handle 94, and if the contact switch 100 is also activated, then the device 90 will activate in the heating mode. If a beverage container without a handle is inserted into the device 90, and the contact support base 52 is pressed down until the contact switch 100 is activated, then the device 90 will be activated in the cooling mode. Removal of a beverage container from the device 90 deactivates the device 90. A backup microprocessor shut-off switch automatically turns the device off after a predetermined time with no container insertion or withdrawals, or when battery charge is below a preset level. These mechanisms act to preserve battery life. The device self adjusts and self conforms to container contours, as shown in FIG. 13, and for container top-to-bottom taper, as shown in FIG. 12.

Due to the increased thermal efficiency of this device over previous devices, heat can be efficiently transferred from a container, causing it to be quite cold and even causing freezing of the food. Heat can also be efficiently transferred into a container, causing it to be quite hot. This results in the ability to freeze food objects in the container, or to cook objects in the container. Cooking a container of soup, a hot dog in a container, heating a baby bottle, or other uses of this device are possible.

While there is shown and described the present preferred embodiment of the invention, it is to be distinctly understood that this invention is not limited thereto but may be variously embodied to practice within the scope of the following claims.

I claim:

1. A device for holding beverage containers which have a side wall, which comprises:

one or more thermal contact members which surround or partially surround said container, in which each thermal contact member is configured to adjust for a top-to-bottom taper of said container, in order to contact directly said container side wall, and which serves as an active heat exchange surface for cooling said beverage container, and for stabilizing and cooling said container; and a means of maintaining affirmative contact of said thermal contact member with said container side wall.

2. The device of claim 1 in which said container contact members intimately conform to said container side walls, for effective stabilizing of said container.

3. The device of claim 1 in which said means of maintaining affirmative contact of said container contact members with said container is medium filled cylindrical contact members.

4. The device of claim 2 which further comprises a flexible and pliable medium filled cylindrical section for facilitating intimate contact with said beverage container.

5. A device for holding beverage containers which have a circumference, side walls, and/or a top-to-bottom taper, which comprises:

one or more thermal transfer members which surround or partially surround said container, in which each thermal transfer member is configured to intimately conform to said container, and to self adjust for varying circumferences and top-to-bottom taper, in order to contact directly said container side wall, for stabilizing and cooling said container;

a means of maintaining intimate contact with said members and said container;

a means of maintaining affirmative contact of said thermal transfer members with said container; and a means of removing heat from said heat transfer member.

6. The device of claim 5 which further comprises a means of heating said container by adding heat to a thermal transfer member, and a cooling and heating function selection device which selects either a cooling or a heating mode for said device.

7. The device of claim 6 in which said means of removing heat from or adding heat to said heat transfer member is a thermoelectric module, comprising:

a source of electrical power;

a heat exchange system which removes or adds heat to or from said thermoelectric module;

a means of sensing a temperature of contents of said container;

a means of activating said device.

8. the device of claim 3 in which said means of maintaining affirmative contact of said contact members with said container is by one or more semi-cylindrical sections which contain a self-conforming medium and surround or partially surround said container and which define a generally cylindrical aperture for receiving said container.

9. The device of claim 5 in which said means of maintaining affirmative contact of said thermal transfer members with said container is by a flexible and pliable self conforming medium which is generally cylindrical and defines an aperture for receiving said container, and surrounds or partially surrounds said container.

10. The device of claim 6 in which said means of removing heat from said heat transfer member is a heat exchanger which is cooled by a liquid or gas.

11. The device of claim 5 which further comprises a housing for enclosing at least one device, in which said housing comprises a wall portion, a container support base, and a rim which defines an access opening for introducing and removing said container.

12. The device of claim 5 in which said means of maintaining affirmative contact between said thermal transfer members and said container is by a tension device which presses each thermal transfer member against said container, and which compensates for varying circumferences and top-to-bottom taper of containers.

13. The device of claim 5 in which said means of affirmative contact comes from pushing container into a soft, resilient conforming aperture, and which compensates for varying container contours, circumferences and top-to-bottom taper of containers.

14. The device of claim 11 in which said means of conforming to varying circumferences between said thermal transfer members and said container further comprises a flexible and pliable interface surface which comprises one or more sections on said thermal transfer member which conforms itself by means of a flexible and conforming surface with a resilient under surface to contours of said container and which may accommodate top-to-bottom taper, in order to maximize surface contact and provide more efficient heat transfer.

15. The device of claim 5 in which said thermal transfer members further comprise;

a medium filled chamber for holding a heat transfer medium; and a heat transfer medium which is contained in said medium filled chamber and which transfers heat, and which forces said interface surface against said container by internal pressure, and conforms intimately to said container side walls, and which may adjust for top-to-bottom taper.

16. The device of claim 15 in which said interface surface conforms to said container side walls by means of a soft and pliable medium filled gasket behind said interface surface and also has a means of equalizing internal pressure in said medium, in which said internal pressure provides resilient force for intimate contact.

17. The device of claim 11 in which said housing defines a slot, for receiving a handle of a container.

18. A device for heating and cooling beverage containers which have a circumference and a top-to-bottom taper, which comprises:

a housing for enclosing at least one device, in which said housing comprises a wall portion, a container support base, and a rim which defines an access opening for introducing and removing said container, and may include a rim for receiving said handle of said container;

one or more thermal transfer members, in which each thermal transfer member is cylindrical or semi cylindrical and surrounds or partially surrounds a container, has a flexible and pliable surface layer, and is concave on a side facing said container, and articulated to adjust for varying circumferences and top-to-bottom tapers of containers, and which self adjusts for said container circumference and top-to-bottom taper, to maintain intimate heat transfer contact with and support said container, for stabilizing and cooling or heating said container, and contains at least one thermoelectric module thermally communicated to a heat transfer medium which transfers heat between said thermoelectric module and said beverage container;

a cooling and heating function selection device which selects either a cooling function or a heating function for said device;

a tightening means which intimately conforms each thermal transfer member against said container, in a manner which compensates for varying circumferences and top-to-bottom taper of containers, for maintaining affirmative contact of said thermal transfer members with said container;

a thermoelectric module which adds or removes heat from said heat transfer medium, which comprises:

a heat transfer plate for adding or removing heat from a heat transfer medium; and a source of electrical power;

a heat exchange system which removes or adds heat to or from said thermoelectric module;

a means of sensing a temperature of contents of said container;

a means of activating said thermoelectric module by insertion of a beverage container, and a means of deactivation by removal of said beverage container; and a means of regulating said thermoelectric module in relation to said means of sensing temperature.

19. The device of claim 18 in which said heat exchange system further comprises a radiator section, a means of heat removal from said radiator section, and a secondary heat removal medium.

20. The device of claim 18 in which insertion of a cool beverage activates said device in a cooling mode, and insertion of a warm beverage activates said device in a heating mode.

21. The device of claim 18 in which said means of removing heat from said heat transfer member is a liquid or gas.

22. The device of claim 18 in which said means of maintaining contact between said thermal transfer members and said container further comprises a pliable interface surface on said thermal transfer member which conforms itself to contours of said container in order to maximize surface contact and provide more efficient heat transfer.

23. The device of claim 18 in which said thermal transfer members further comprise;
- a medium filled chamber for holding a heat transfer medium; and
- a heat transfer medium which is contained in said medium filled chamber and which transfers heat from said heat transfer plate to said interface surface, and which forces said interface surface against said container.

24. The device of claim 18 in which said heat transfer members contact said container as it is inserted into said device with a frictionless engagement.

25. The device of claim 18 in which said articulation occurs in two axes.

26. A device for holding beverage containers which have a side wall, which comprises:
- one or more thermal contact members which surround or partially surround said container, in which each thermal contact member is configured to self adjust to contact with said container side wall, and which serves as an active heat exchange surface for cooling said beverage, and for stabilizing and cooling said container; and
- a means of maintaining affirmative contact of said thermal contact member with said container side wall.

27. The device of claim 1, in which said means of maintaining affirmative contact of said container contact members with said container are medium filled semi-cylindrical contact members.

28. The device of claim 2, which further comprises a flexible and pliable medium-filled semi-cylindrical section for facilitating intimate contact with said beverage container.

29. The device of claim 3 in which said means of maintaining affirmative contact of said contact members with said container is by one or more cylindrical sections which contain a self-conforming medium which surround or partially surround said container and which define a generally cylindrical aperture for receiving said container.

30. A device for holding beverage containers which have a circumference, side walls, and a top-to-bottom taper, which comprises:
- one or more flexible and pliable medium filled semi-cylindrical thermal transfer members which surround or partially surround a said container, in which each thermal transfer member is concave on a side facing said container, and configured to intimately conform to said container and to self adjust for varying circumferences and top-to-bottom tapers of containers, and which self adjusts for said container circumference and top-to-bottom taper, to maintain intimate heat transfer contact with and to provide support of said container, and for stabilizing and cooling said container;
- a means of maintaining affirmative contact of said thermal transfer members with said container side wall;
- a means of heating said container by adding heat to a thermal transfer member;
- a cooling and heating function selection device which selects either a cooling or a heating function for said device;
- a means of activating said device by insertion of a beverage container, and deactivating said device by removal of said beverage container; and
- a means of removing heat from said thermal transfer member comprising a thermoelectric module, the thermoelectric module comprising:
  a source of electrical power;
  a heat exchange system which removes or adds heat to or from said thermoelectric module;
  a means of sensing a temperature of contents of said container;
  a means of activating said device; and
  a means of regulating said thermoelectric module in relation to said means of sensing temperature.

31. A device for holding beverage containers which have a side wall, which comprises:
- one or more thermal contact members which surround or partially surround said container, in which each thermal contact member is configured to adjust to contact with said container side wall, and which is mounted to a supportive section of said device, and in which said thermal contact members serve as active heat exchange surfaces for cooling said beverage, and for stabilizing and cooling said container; and
- a means of maintaining affirmative contact of said thermal contact member with said container side wall.

* * * * *